(12) United States Patent
Linjama et al.

(10) Patent No.: US 8,423,080 B2
(45) Date of Patent: Apr. 16, 2013

(54) COLOR DETECTION WITH A MOBILE DEVICE

(75) Inventors: Jukka Tapio Linjama, Espoo (FI); Kalle Eino Olavi Pikkujamsa, Espoo (FI)

(73) Assignee: Nokia Corporation, Espoo (FI)

( * ) Notice: Subject to any disclaimer, the term of this patent is extended or adjusted under 35 U.S.C. 154(b) by 524 days.

(21) Appl. No.: 12/164,903

(22) Filed: Jun. 30, 2008

(65) Prior Publication Data

US 2009/0325631 A1 Dec. 31, 2009

(51) Int. Cl.
*H04M 1/00* (2006.01)
*G06K 9/00* (2006.01)

(52) U.S. Cl.
USPC ......... 455/556.1; 455/566; 382/162; 356/425

(58) Field of Classification Search ............... 455/556.1, 455/566, 414.1, 550.1, 575.1; 382/162; 356/4.01–5.15, 402, 425
See application file for complete search history.

(56) References Cited

U.S. PATENT DOCUMENTS

| | | | |
|---|---|---|---|
| 7,174,031 B2 * | 2/2007 | Rhoads et al. ................. | 382/107 |
| 7,536,034 B2 * | 5/2009 | Rhoads et al. ................. | 382/107 |
| 7,949,370 B1 * | 5/2011 | Bledsoe et al. ............ | 455/556.1 |
| 2005/0034084 A1 * | 2/2005 | Ohtsuki et al. ................ | 715/864 |
| 2005/0243400 A1 | 11/2005 | Brabec et al. | |
| 2006/0044559 A1 | 3/2006 | Foy-Watson | |
| 2006/0046781 A1 * | 3/2006 | Barfoed et al. ............... | 455/557 |
| 2006/0139644 A1 | 6/2006 | Kahn et al. | |
| 2007/0172116 A1 * | 7/2007 | Barnes et al. ................. | 382/162 |
| 2009/0042605 A1 * | 2/2009 | Reponen .................... | 455/556.1 |
| 2009/0185736 A1 * | 7/2009 | Nepomniachtchi ........... | 382/137 |
| 2009/0252371 A1 * | 10/2009 | Rao .............................. | 382/100 |

FOREIGN PATENT DOCUMENTS

| | | |
|---|---|---|
| EP | 1 528 380 A1 | 5/2005 |
| WO | WO 02/25234 A1 | 3/2002 |
| WO | WO 2004/026012 A1 | 3/2004 |
| WO | WO 2006/127840 A2 | 11/2006 |
| WO | WO 2008/036644 A1 | 3/2008 |

OTHER PUBLICATIONS

International Search Report and Written opinion for Application No. PCT/IB2009/006098 dated Sep. 7, 2009.
Color Sensor [online] [retrieved Jun. 16, 2008]. Retrieved from the Internet: <URL: http://www.philohome.com/sensors/colorsensor.htm>. 4 pages.
Color Sensor Circuit Diagram [online] [retrieved Jun. 16, 2008]. Retrieved from the Internet: <URL: http://www.electronic-circuits-diagrams.com/sensorsimages/sensorsckt3.shtml>. 2 pages.

* cited by examiner

*Primary Examiner* — Blane J Jackson
(74) *Attorney, Agent, or Firm* — Alston & Bird LLP

(57) ABSTRACT

A system and method includes a detecting at least one color on a substrate using a mobile communication device, identifying the detected color and outputting a result of the identification with the mobile communication device.

18 Claims, 9 Drawing Sheets

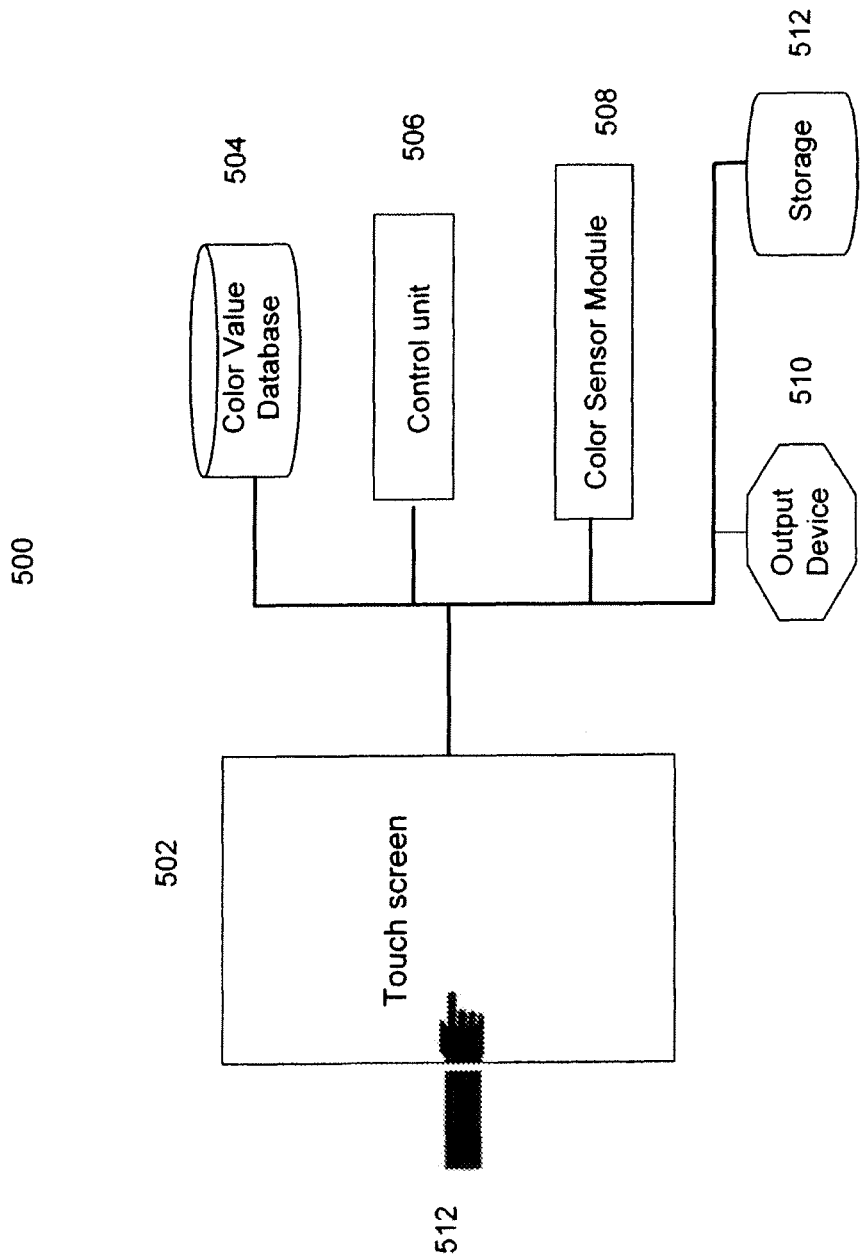

COLOR DETECTION WITH A MOBILE DEVICE

BACKGROUND

1. Field

The aspects of the disclosed embodiments generally relate to color detection and sensing systems and more particularly to mobile devices that incorporate color detection and sensing systems.

2. Brief Description of Related Developments

Color detection systems are generally known in areas other than mobile communication devices. For example, there are systems that measure or determine paint colors for matching paints. These systems tend to be dedicated and accurate systems found in establishments such as paint shops, for example. Systems for color sensing tend to be very expensive and large, and generally not suitable for mobile devices.

Many mobile communication devices, such as mobile phones, include cameras. Some phone cameras can also measure surface color with very limited accuracy (ambient light may tend to distort results, etc.).

It would be advantageous to be able to use a mobile communication device to sense and measure colors.

SUMMARY

The aspects of the disclosed embodiments are directed to at least a method, apparatus, user interface and computer program product. In one embodiment the method includes detecting at least one color on a surface of a substrate using a mobile communication device and adjusting a color of a cover of the mobile communication device to correspond to the detected color.

BRIEF DESCRIPTION OF THE DRAWINGS

The foregoing aspects and other features of the embodiments are explained in the following description, taken in connection with the accompanying drawings, wherein:

FIG. 5 illustrates a block diagram of the architecture of an exemplary user interface incorporating aspects of the disclosed embodiments;

DETAILED DESCRIPTION OF THE EMBODIMENT(S)

Figure 1:
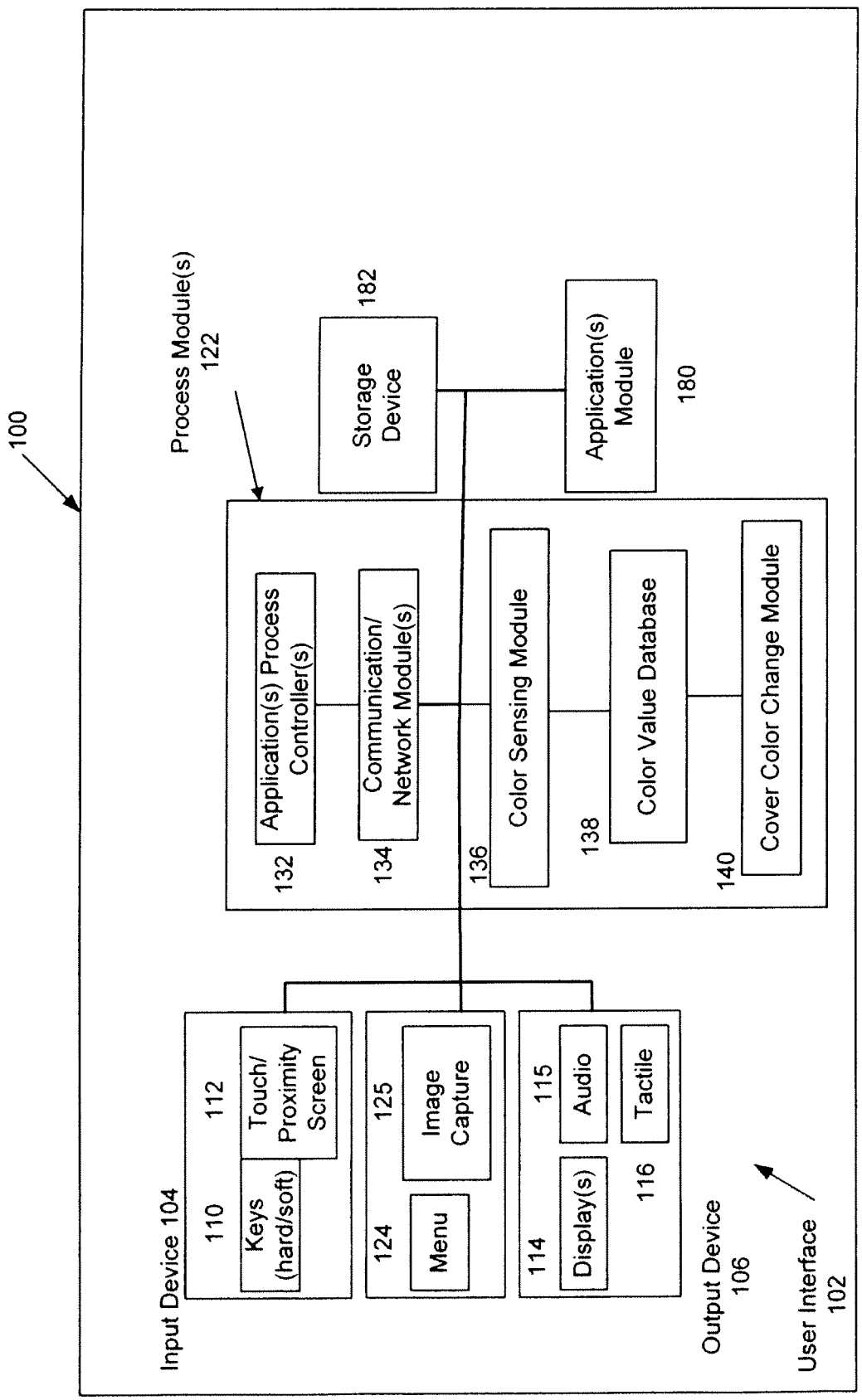
FIG. 1 shows a block diagram of a system in which aspects of the disclosed embodiments may be applied.

FIG. 1 illustrates one embodiment of a system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

The aspects of the disclosed embodiments generally allow a user to sense and measure color using a mobile device, such as for example, a mobile communication device.

Color sensing circuits and modules are generally known, and the aspects of the disclosed embodiments can be practiced using any suitable color sensing circuit or module. An accurate color sensor with well-defined illumination can generally measure the color of any surface. Ambient light generally does not disturb the analysis. In one embodiment a color sensing circuit can be incorporated directly onto a circuit board of the underlying mobile device. In an alternate embodiment, an off-the-shelf color sensing module or sensor can be incorporated into, or as an add-on, to the hardware of a mobile communication device. The aspects of the embodiments disclosed herein are not intended to be limited by the type of available color sensing module, sensor, circuit or application.

Figure 6A:
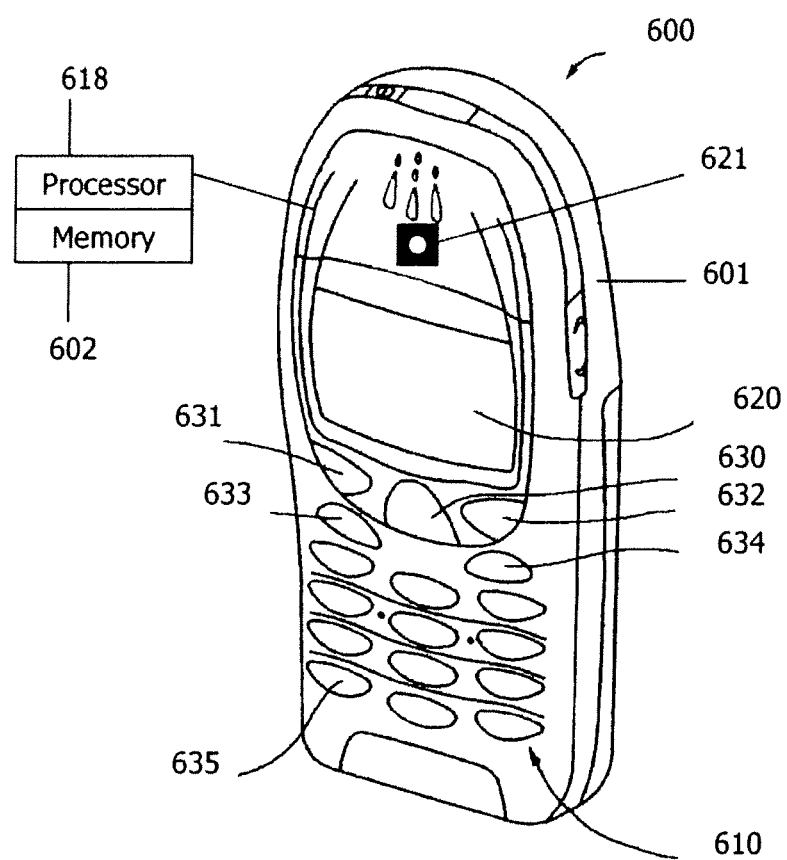
FIGS. 6A and 6B are illustrations of exemplary devices that can be used to practice aspects of the disclosed embodiments.

In one embodiment, referring to FIG. 6A, one example of a mobile device 600 incorporating aspects of the disclosed embodiments is illustrated. Although the mobile device 600 is generally referred to herein as a mobile communication device, in an alternate embodiment any suitable mobile device application can be utilized. The mobile device 600 includes a color sensor 621, also referred to herein as a "color sensing module". Although a color sensor will generally be referred to herein for descriptive purposes, it will be understood that the portion of the color sensor 621 that is visible or apparent to the user is a lens for the color sensing module. In one embodiment, the color sensor 621 includes a combination of a color sensor mechanism and a white light device, such as for example an LED or other light style device.

In one embodiment, the actual color sensing module or circuitry is located within the hardware of the device 600, such as on a circuit board within the housing 601.

The lens or image collection component of the color sensor 621, is mounted in a suitable location in the device 600 so that at least the lens portion is visible or accessible through the cover of the device 600. Although the color sensor 621 is shown as being located on a front cover portion of the device 600, in alternate embodiments the color sensor 621 can be placed or located in any suitable area of the cover 601 of the device including for example, on the back or a side of the cover 601. The aspects of the disclosed embodiments are not intended to be limited by the location of the color sensor 621 on the cover or housing 601 of the device 600.

Figure 2:
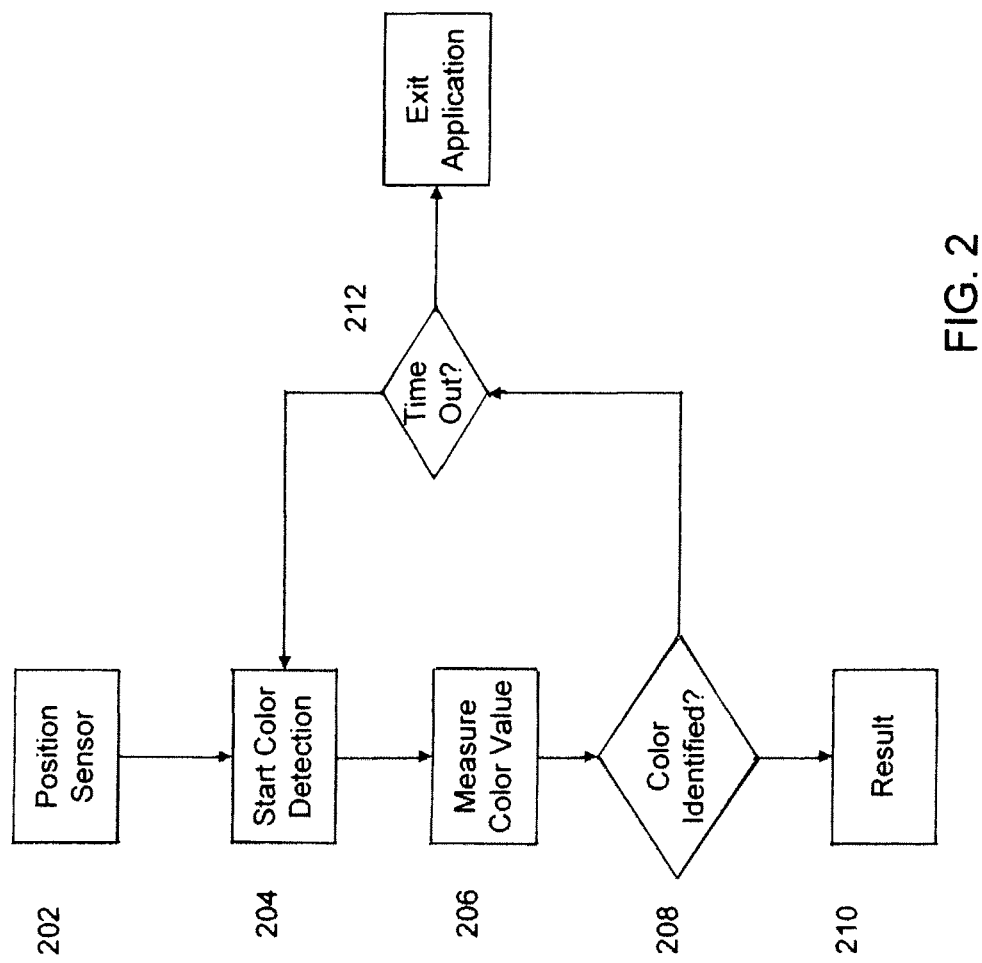
FIG. 2 illustrates an example of a color measurement process incorporating aspects of the disclosed embodiments.
Figure 3:
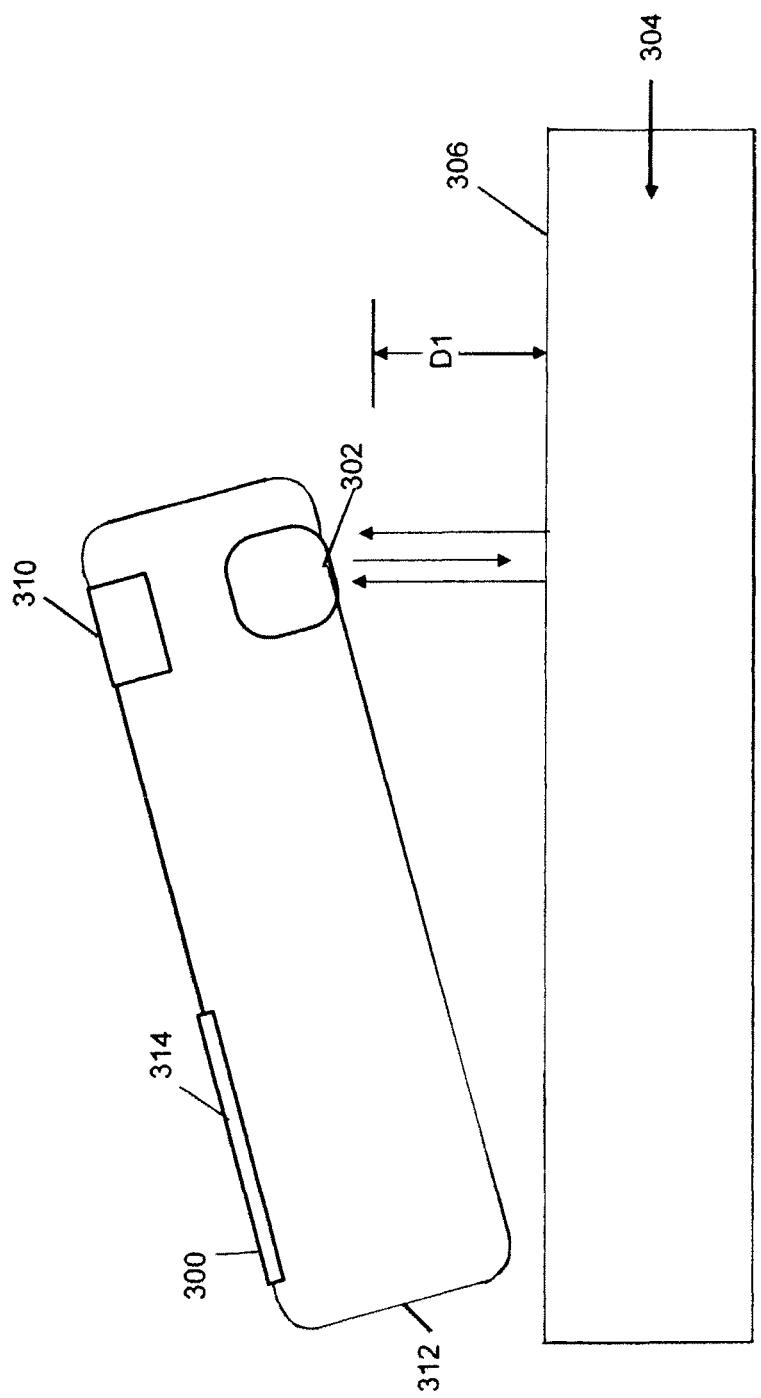
FIG. 3 illustrates an exemplary application of the aspects of the disclosed embodiments.

Referring to FIGS. 2 and 3, the sensor 302 of the mobile device 300 is positioned 202 on or over the surface 306 of the substrate 304 on which the color to be determined is located. In one embodiment, direct contact of the sensor 302 with the substrate 304 is not required. The sensor 302 may only need to be positioned at a distance D1 from a surface 306 of the substrate 304 that allows the sensor to properly detect and image the color value on the substrate 304.

Once the sensor 302 is positioned, the color detection application can be initiated 204. In one embodiment, this can comprise activating a function key corresponding to the color detection application. In an alternate embodiment the color detection application can be activated and then the sensor 302 can be positioned over the substrate. In one embodiment, the device 300 can include a notification device that informs the user that the sensor 302 is in a proper position after the color detection application is activated. This can include an audible or visual notification, such as for example a ping or illumination of a light or LED 310 on the device 300.

The color value is measured 206. The measurement of the color value can be carried out in accordance with respect to the particular sensor 302 being used. In one embodiment, where the color sensing module comprises the sensor 302 and a white led, the color sensing module measures the color (RGB value) of the surface 306 of the substrate 304. In one embodiment, the color value can be measured by comparing two individual measurements and indicating a difference between the two individual measurements.

A determination 208 is made as to whether the color is identified. In one embodiment, the color identification process can include comparing a detected color value or values to a database of color values to determine if there is a match. The database can be stored in the mobile device 300, or can also be external to the device 300. For example, in one embodiment, the sensor 302 detects a color value. This value can be temporarily stored in the device 300 and then compared to the values stored in the database and/or sent or uploaded in any suitable fashion to a color matching service. The color matching service can be an application stored on a server coupled to the device 300, or an Internet based service. The result of the color matching process can be sent back to the device in any suitable fashion, such as for example, a text message, multimedia message or electronic mail message.

If the color is not or cannot be identified or determined, in one embodiment, the color detection application can restart 204. In an alternate embodiment, if a time out period or a permitted number of retries 212 has been exceeded, the color detection application can be closed or exited 214, and the user informed that the color detection was not successful. If the color is identified, the results can be saved or outputted 210.

In one embodiment, the result of the color identification process described with respect to FIGS. 2 and 3 can be stored and then used later for comparison purposes against another measured color value. The color of a first substrate is determined and stored. The color of a second substrate is also determined and stored, and the two values can be compared to determine if there is a match. Although measurements with respect to two substrates is generally described herein, in alternate embodiments, any suitable number of substrates can be measured and compared. For example, a user desires to match a color of fabric on a piece of furniture to other fabric samples. In one embodiment the mobile device 300 is placed near or on the fabric of the furniture. A color measurement is taken and the value stored in a memory of the device 300. The user can then take the device 300, compare the stored value to a newly measured value, for example a new piece of fabric, and determine if the two measurements match. In one embodiment, the second value does not need to be stored in order to make the comparison. For example, a color matching application of the device can compare a newly measured value to a stored value, without storing the newly measured value. This allows for scanning the sensor 302 of the device 300 over a substrate 306, comparing the result to a previously stored color value and making a determination if there is a color match. This advantageously provides quick and portable color matching capability. In one embodiment, the values can be temporarily stored until a substrate is selected or a color match is determined. The values to be stored can then be selected and saved.

The color result(s) can be outputted in any suitable manner. In one embodiment, the result can be presented on a display of the device 300 in any suitable form, such as for example by a textual indicator, image or an audible indication. In an embodiment where the detected color value is transmitted to an external color matching service, the reply with the detected color may be in the form of a text message, multimedia message or email.

In one embodiment, the output of the color result 208 can comprise changing a color of at least a portion of the cover or housing of the device 300 to correspond to the detected color. For example, in one embodiment the cover 312 can include an under display area or region 314 that is configured to adjust or change to the detected color. The under display region 314 can include LEDs or other light configurations that, either alone or in combination, produce the detected color. In one embodiment, LED's, or other suitable light devices, in the under display region 314 can project light into or around the housing of the device, also referred to as the "skin" of the device, to produce a color effect. In one embodiment, the device 300 can include light carrying fibers, such as fiber optic fibers, or channels that are configured to carry and project light. In alternate embodiment, any suitable light carrying fiber or channel can be used. These types of fibers and channels can carry light to specific areas, or project light along the entire length of the fiber or channel. In one embodiment, the fibers or channels can be embedded within the housing of the device 300 and used to change a color of the skin of one or more portions of the housing. In alternate embodiments, the LED's and/or light fibers can be located in any suitable area of the device 300, including for example, under the keymat of the device, under a specific navigation device, such as an input key or joystick/rocker or a surface of the device 300.

Although the under display region 314 is shown on one side of the cover 312 in FIG. 3, it should be understood that this region 314 can be along any suitable portion or area of the cover 312. For example, the under display region 314 can be on a side of the cover or a front or back area. In one embodiment, where the cover 312 comprises a translucent material, the entirety of the cover 312 can comprise the under display region 314. In this example, the whole cover can be configured to illuminate with the detected color. In another embodiment, where the cover 312 comprises a material, such as an electrochemically reactive material, that changes color in response to electrical impulses or heat, the detection of the color by the sensor 302 will cause the device 300 to generate corresponding electrical signal(s) to cause the desired color change in the cover 312, or portion thereof.

Some applications of the embodiments described herein will now be described. In one example, User A desires to match a fabric color on a piece of furniture in order to purchase similarly colored material. User A scans the textile of the furniture using the mobile communication device of the disclosed embodiments to measure the color of the textile, and then saves the color information in the mobile communication device. User A can then shop for similarly colored materials by measuring different colored samples and comparing them to the saved color information.

In another example, User B uses the mobile communication device of the disclosed embodiments to get advice in color selection. User B takes samples of the colors on the surfaces of the clothes User B is interested in. In one embodiment, the mobile communication device includes or has access to an application or service that stores information related to recent clothing style trends as well as User B's personal preferences. The samples that User B takes using the mobile communication device of the disclosed embodiments can be compared to the information stored in this application or service to identify suitable clothing that matches User B's preferences and styles.

Figure 4:
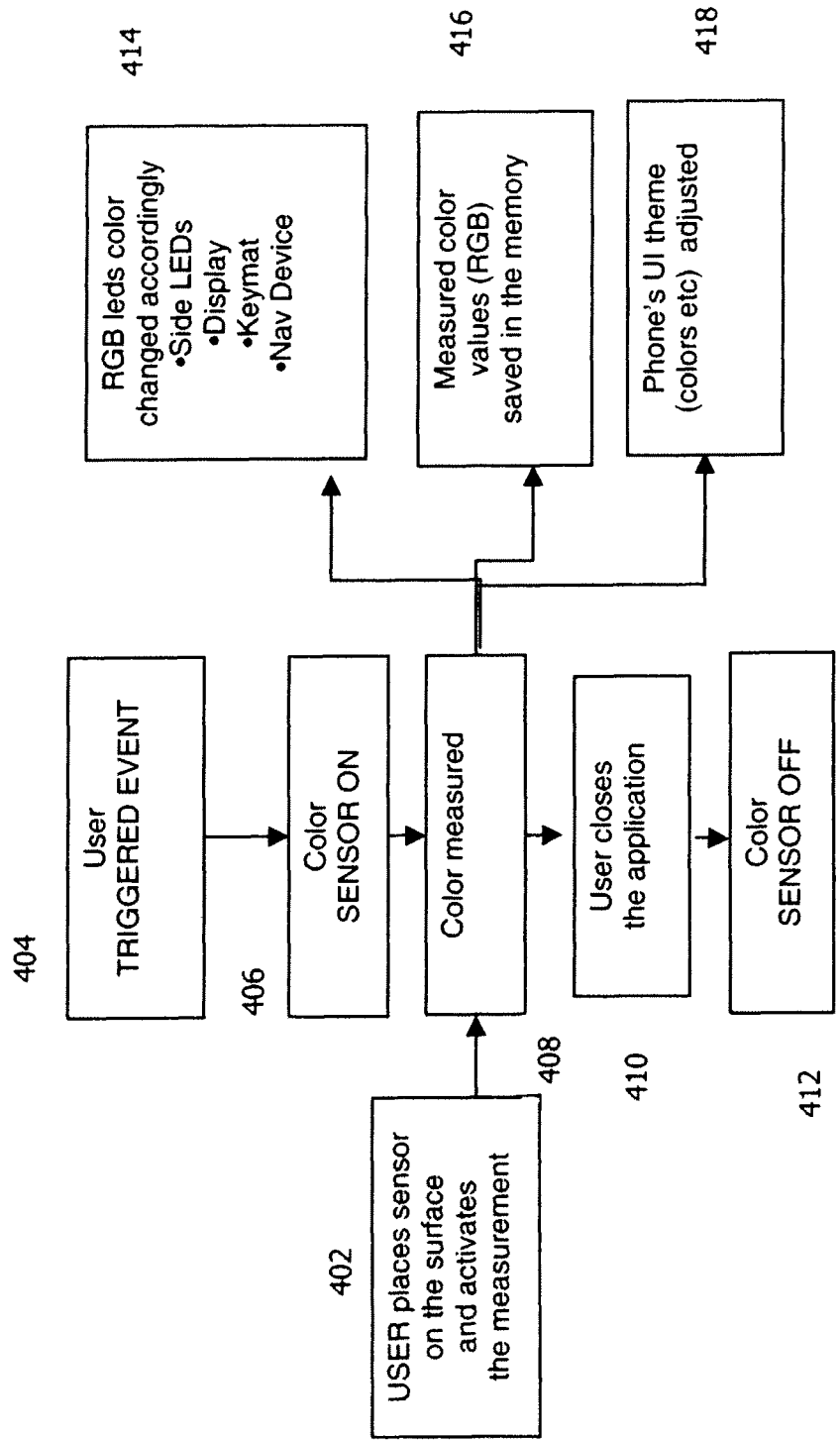
FIG. 4 illustrates an example of a process incorporating aspects of the disclosed embodiments.

FIG. 4 illustrates an embodiment of a process incorporating aspects of the disclosed embodiments. In one embodiment, to begin the color measurement processes the user places 402 the color sensor of the mobile communication device on or near the surface to be measured and activates the color detecting application. In one embodiment, the activation or initiation of the color measurement in the mobile communication device can comprise a user-triggered event 404. In one embodiment, a user-triggered event generally requires that the user activate the color measurement process or the color measuring application. This allows the user to know when the color measuring application is active and to control the power (battery) management of the device. When power management is not a concern, with large battery or non-battery power sources, a user-triggered event may not be necessary. User triggered events can include, but are not limited to, a key activation, shaking the device, tapping the device or voice activation, for example. In alternate embodiments, any event that activates a terminal application function can be used to activate the color detecting application. Detection of a user triggered event 404 automatically activates 406 the color sensor of the mobile communication device.

In one embodiment, after the color is measured 408, the application is closed 410 and the color sensor turned off 412. The application can be closed 410 manually by the user or automatically in response to execution of a predetermined condition, such as identifying or storing the measured color, or a timeout. In alternate embodiments, any suitable criteria can be used for determining when to close the application.

In one embodiment, after the color measurement 408, the color information is outputted. The color information or measurement data can be outputted in a number of different ways. In one embodiment, the color measurement 408 is outputted using LEDs 414. The mobile communication device can include LEDs that are configured to change or adjust colors to correspond with the color measurement 408. The LEDs can be incorporated into the housing of the device, in the display or in the keymat, for example. Alternatively, the display of the device can include can include a color portion that is configured to adjust and present the color measurement 408.

In one embodiment, the color measurement can be saved and stored 416 in a memory of the mobile communication device.

In one embodiment, a theme of the user interface of the mobile communication device can be configured to correspond to the color measurement 408. For example, a color scheme of the user interface can change corresponding to the color measurement 408. As an example, the user measures the color of a piece of clothing. The user interface or skin of the device can be configured to change color correspond to the color determined by color measurement 408. In one embodiment where a precise color matching the color measurement 408 is not available in the device, a similar color can be presented.

Referring to FIG. 1, the system 100 of the disclosed embodiments can generally include input device(s) 104, output device(s) 106, process module 122, applications module 180, and storage/memory device(s) 182. The components described herein are merely exemplary and are not intended to encompass all components that can be included in the system 100. The system 100 can also include one or more processors or computer program products to execute the processes, methods, sequences, algorithms and instructions described herein.

The input device(s) 104 are generally configured to allow a user to input data, instructions and commands to the system 100. In one embodiment, the input device 104 can be configured to receive input commands remotely or from another device that is not local to the system 100. The input device 104 can include devices such as, for example, keys 110, touch screen 112, menu 124, at least one imaging device 125, such as a lens and filter combination, a camera or such other image capturing system. In alternate embodiments the input device can comprise any suitable device(s) or means that allows or provides for the input and capture of data, information and/or instructions to a device, as described herein. The output device(s) 106 are configured to allow information and data to be presented via the user interface 102 of the system 100 and can include one or more devices such as, for example, a display 114 (which can be part of or include a touch screen 112), audio device 115 or tactile output device 116. In one embodiment, the output device 106 can be configured to transmit information to another device, which can be remote from the system 100. While the input device 104 and output device 106 are shown as separate devices, in one embodiment, the input device 104 and output device 106 can be combined into a single device, and be part of and form, the user interface 102. The user interface 102 of the disclosed embodiments can be generally configured to allow a user to sense and measure at least one color on a substrate, and then identify the color to the user. While certain devices are shown in FIG. 1, the scope of the disclosed embodiments is not limited by any one or more of these devices, and an exemplary embodiment can include, or exclude, one or more devices. For example, in one exemplary embodiment, the system 100 may only provide a limited display, or no display at all. A headset, or other listening device, can be used as part of both the input devices 104 and output devices 106 so that the color information can presented to the user in an audible fashion.

The process module 122 is generally configured to execute the processes and methods of the disclosed embodiments. The application process controller 132 can be configured to interface with the applications module 180, for example, and execute applications processes with respects to the other modules of the system 100. In one embodiment, the applications module 180 is configured to interface with applications that are stored either locally to or remote from the system 100 and/or web-based applications. The applications module 180 can include any one of a variety of applications that may be installed, configured or accessed by the system 100, such as for example, office, business, media players and multimedia applications, web browsers and maps. In alternate embodiments, the applications module 180 can include any suitable application. The communication module 134 shown in FIG. 1 is generally configured to allow the device to receive and send communications and messages, such as text messages, chat messages, multimedia messages, video and email, for example. The communication module 134 is also configured to receive information, data and communications from other devices and systems.

In one embodiment, the process module 122 includes a color sensing module or engine 136. The color sensing module 136 can be configured to detect and identify color values as described herein. The color sensing module 136 can include any suitable color detection module. The color-sensing module includes a sensor and a white LED.

The process module 122 can also include a color value database 138 that is configured to retrieve, store and provide color value information. In one embodiment, a color measurement made by the color sensing module 136 is compared to the information stored in the color value database 138 to determine a color match or similarity. In an alternate embodiment, the color value database 138 is configured to communicate with an external service to determine color value and color matching information.

In one embodiment, the process module 122 can also include a cover color change module or engine 140. The cover color change module 140 is generally configured to output a result of the color measurements described herein by configuring lights or LEDs within the device 100, or providing a suitable input or command to a control module, when a housing of the device 100 is an electro-chemically reactive housing. In an embodiment where the housing of the device 100 includes light fibers or channels, the cover color change module 140 can be configured to generate the light required to produce the color corresponding to the color determined by the color sensing module 136.

FIG. 5 illustrates an exemplary user interface system incorporating aspects of the disclosed embodiments. In one embodiment, the user interface system 500 includes a display interface device 502, such as a touch screen display. In alternate embodiments, the display interface device 502 comprises a user interface for a visually impaired user, that does not necessarily present text on the display so that it can be viewed, but allows the user to provide inputs and receive feedback for the identification of color in accordance with the embodiments described herein. A pointing device or pointer 512, which in one embodiment can comprise a stylus or the user's finger, is used to provide input to the display interface device 502. A control unit 506 is used control the activation of the color sensor 508 and the color measurement process. The output device 510 is configured to control the result of the measurement process, whether it be a visual output or audible output. In the situation where the color measurement result is not directly outputted, but stored, the control unit 506 is configured to communicate the results to a storage facility 512, which can be direct coupled or remotely coupled.

Referring to FIG. 1, in one embodiment, the user interface of the disclosed embodiments can be implemented on or in a device that includes a touch screen display 112, proximity screen device or other graphical user interface. In one embodiment, the display 112 can be integral to the system 100. In alternate embodiments the display may be a peripheral display connected or coupled to the system 100. A pointing device, such as for example, a stylus, pen or simply the user's finger may be used with the display 112. In alternate embodiments any suitable pointing device may be used. The display can also include or comprise, for example, a flat display that is typically made of a liquid crystal display (LCD) with optional back lighting, such as a thin film transistor (TFT) matrix capable of displaying color images. Although display 114 of FIG. 1 is shown as being associated with output device 106, in one embodiment, displays 112 and 114 form a single display unit.

The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information, such as text, on the screen of the device. Thus, the above noted terms are intended to include that a user only needs to be within the proximity of the device to carry out the desired function. It should also be understood that arrow keys on a keyboard, mouse style devices and other cursors could be used as the pointing device and to move a pointer.

Similarly, the scope of the intended devices is not limited to single touch or contact devices. Multi-touch devices, where contact by one or more fingers or other pointing devices can navigate on and about the screen, are also intended to be encompassed by the disclosed embodiments. Non-touch devices are also intended to be encompassed by the disclosed embodiments. Non-touch devices include, but are not limited to, devices without touch or proximity displays or screens, where navigation on the display and menus of the various applications is performed through, for example, keys 110 of the system or through voice commands via voice recognition features of the system.

Figure 6B:
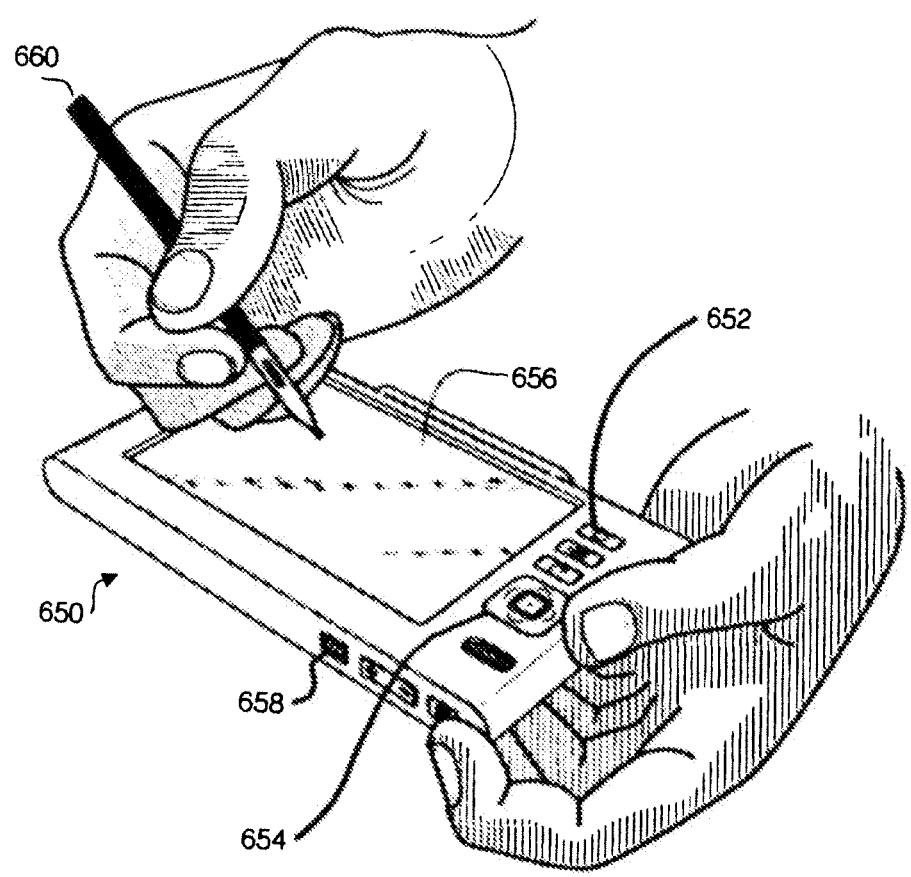

Some examples of devices on which aspects of the disclosed embodiments can be practiced are illustrated with respect to FIGS. 6A-6B. The devices are merely exemplary and are not intended to encompass all possible devices or all aspects of devices on which the disclosed embodiments can be practiced. The aspects of the disclosed embodiments can rely on very basic capabilities of devices and their user interfaces. Buttons or key inputs can be used for selecting and controlling the functions and commands described herein, and a scroll key function can be used to move to and select item(s), such as text.

As shown in FIG. 6A, the device 600, which in one embodiment comprises a mobile communication device or terminal may have a keypad 610 as an input device and a display 620 for an output device. In one embodiment, the keypad 610 forms part of the display unit 620. The keypad 610 may include any suitable user input devices such as, for example, a multi-function/scroll key 630, soft keys 631, 632, a call key 633, an end call key 634 and alphanumeric keys 635. In one embodiment, the device 600 includes an image capture device such as a camera 621, as a further input device. The display 620 may be any suitable display such as, for example, a touch screen display or graphical user interface. The display may be integral to the device 600 or the display may be a peripheral display connected or coupled to the device 600. A pointing device such as, for example, a stylus, pen or simply the user's finger may be used in conjunction with the display 620 for cursor movement, menu selection, text selection and other input and commands. In alternate embodiments, any suitable pointing or touch device may be used. In other alternate embodiments, the display may be a conventional display. The device 600 may also include other suitable features such as, for example, a loud speaker, headset, tactile feedback devices or connectivity port. The mobile communications device may have at least one processor 618 connected or coupled to the display for processing user inputs and displaying information and links on the display 620, as well as carrying out the method steps described herein. At least one memory device 602 may be connected or coupled to the processor 618 for storing any suitable information, data, settings and/or applications associated with the mobile communications device 600.

Figure 7:
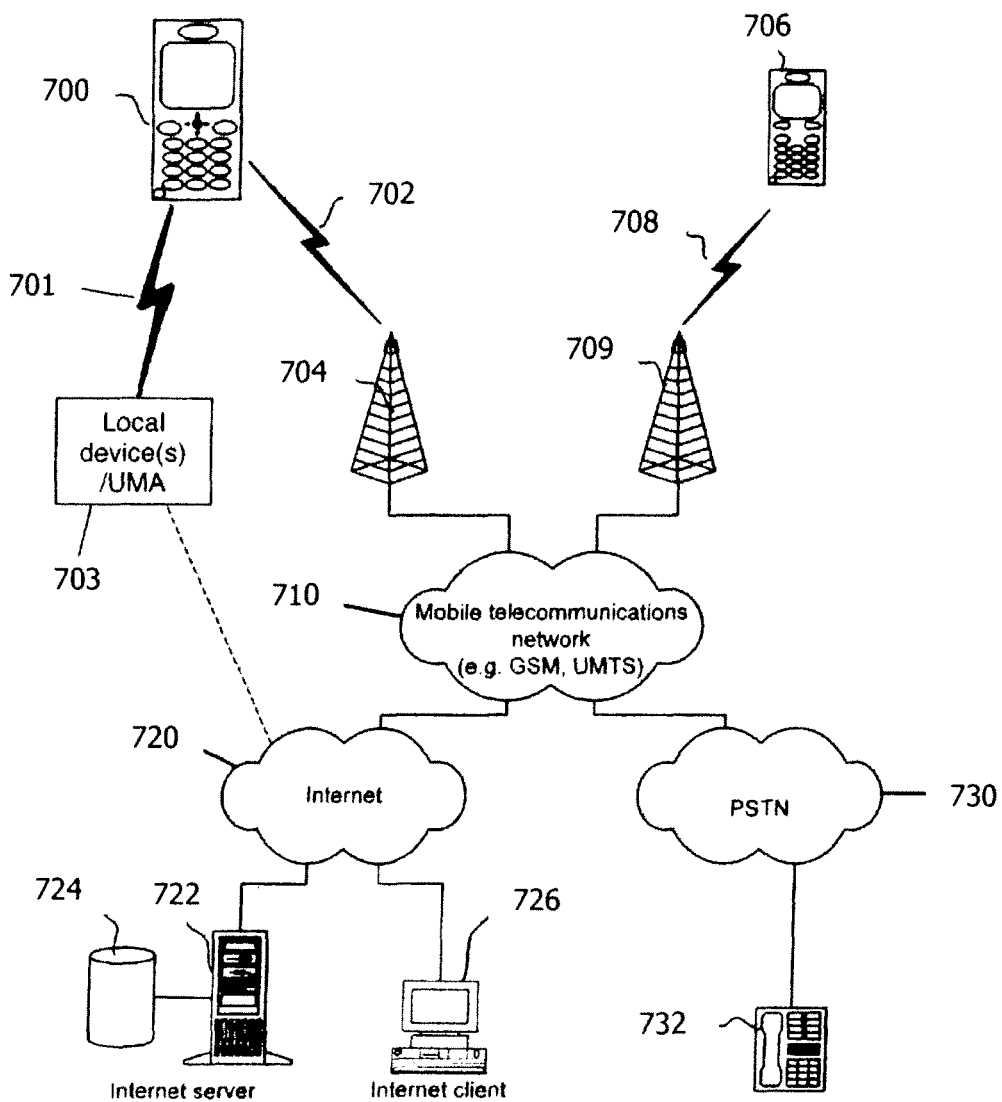
FIG. 7 illustrates a block diagram of an exemplary system incorporating features that may be used to practice aspects of the disclosed embodiments.

In the embodiment where the device 600 comprises a mobile communications device, the device can be adapted for communication in a telecommunication system, such as that shown in FIG. 7. In such a system, various telecommunications services such as cellular voice calls, worldwide web/wireless application protocol (www/wap) browsing, cellular video calls, data calls, facsimile transmissions, data transmissions, music transmissions, multimedia transmissions, still image transmission, video transmissions, electronic message transmissions and electronic commerce may be performed between the mobile terminal 700 and other devices, such as another mobile terminal 706, a line telephone 732, a computing device 726 and/or an internet server 722.

In one embodiment the system is configured to enable any one or combination of chat messaging, instant messaging, text messaging and/or electronic mail, and the text-to-speech conversion process described herein can be applied to the computer understandable text in such messages and/or communications. It is to be noted that for different embodiments of the mobile device or terminal 700, and in different situations, some of the telecommunications services indicated above may or may not be available. The aspects of the disclosed embodiments are not limited to any particular set of services or communication system, protocol or language in this respect.

The mobile terminals 700, 706 may be connected to a mobile telecommunications network 710 through radio frequency (RF) links 702, 708 via base stations 704, 709. The mobile telecommunications network 710 may be in compliance with any commercially available mobile telecommunications standard such as for example the global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 710 may be operatively connected to a wide area network 720, which may be the Internet or a part thereof. An Internet server 722 has data storage 724 and is connected to the wide area network 720, as is an Internet client 726. The server 722 may host a worldwide web/wireless application protocol server capable of serving worldwide web/wireless application protocol content to the mobile terminal 700.

A public switched telephone network (PSTN) 730 may be connected to the mobile telecommunications network 710 in a familiar manner. Various telephone terminals, including the stationary telephone 732, may be connected to the public switched telephone network 730.

The mobile terminal 700 is also capable of communicating locally via a local link 701 to one or more local devices 703. The local links 701 may be any suitable type of link or piconet with a limited range, such as for example Bluetooth™, a Universal Serial Bus (USB) link, a wireless Universal Serial Bus (WUSB) link, an IEEE 802.11 wireless local area network (WLAN) link, an RS-232 serial link, etc. The local devices 703 can, for example, be various sensors that can communicate measurement values or other signals to the mobile terminal 700 over the local link 701. The above examples are not intended to be limiting, and any suitable type of link or short range communication protocol may be utilized. The local devices 703 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 700 may thus have multi-radio capability for connecting wirelessly using mobile communications network 710, wireless local area network or both. Communication with the mobile telecommunications network 710 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the navigation module 122 of FIG. 1 includes communications module 134 that is configured to interact with, and communicate to/from, the system described with respect to FIG. 7.

Although the above embodiments are described as being implemented on and with a mobile communication device, it will be understood that the disclosed embodiments can be practiced on any suitable device incorporating a processor, memory and supporting software or hardware. For example, the disclosed embodiments can be implemented on various types of music, gaming and multimedia devices. In one embodiment, the system 100 of FIG. 1 may be for example, a personal digital assistant (PDA) style device 650 illustrated in FIG. 6B. The personal digital assistant 650 may have a keypad 652, cursor control 654, a touch screen display 656, color sensor 658 and a pointing device 660 for use on the touch screen display 656. In still other alternate embodiments, the device may be a personal computer, a tablet computer, touch pad device, Internet tablet, a laptop or desktop computer, a mobile terminal, a cellular/mobile phone, a multimedia device, a personal communicator, a television or television set top box, a digital video/versatile disk (DVD) or High Definition player or any other suitable device capable of containing for example a display 114 shown in FIG. 1, and supported electronics such as the processor 618 and memory 602 of FIG. 6A. In one embodiment, these devices will be Internet enabled and can include map and global positioning system ("GPS") capability.

The user interface 102 of FIG. 1 can also include menu systems 124 coupled to the processing module 122 for allowing user input and commands. The processing module 122 provides for the control of certain processes of the system 100 including, but not limited to, the controls for selecting files and objects, establishing and selecting search and relationship criteria, navigating among the search results, identifying computer readable text, and detecting commands for the color sensing process. The menu system 124 can provide for the selection of different tools and application options related to the applications or programs running on the system 100 in accordance with the disclosed embodiments. In the embodiments disclosed herein, the process module 122 receives certain inputs, such as for example, signals, transmissions, instructions or commands related to the functions of the system 100, such as messages, notifications, start and stop points and state change requests. Depending on the inputs, the process module 122 interprets the commands and directs the applications process control 132 to execute the commands accordingly in conjunction with the other modules.

Figure 8:
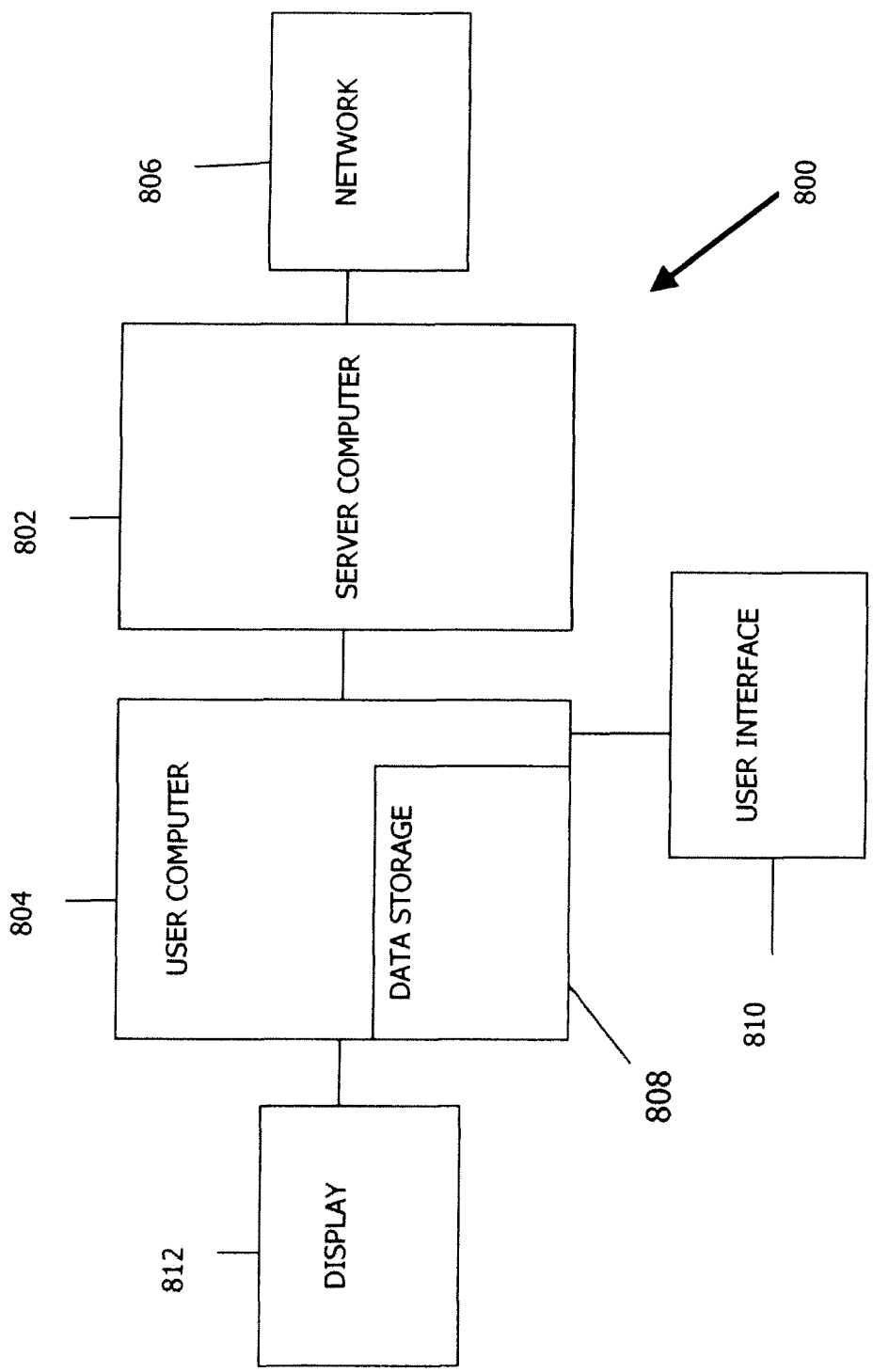
FIG. 8 is a block diagram illustrating the general architecture of an exemplary system in which the devices of FIGS. 6A and 6B may be used.

The disclosed embodiments may also include software and computer programs incorporating the process steps and instructions described above. In one embodiment, the programs incorporating the process steps described herein can be executed in one or more computers. FIG. 8 is a block diagram of one embodiment of a typical apparatus 800 incorporating features that may be used to practice aspects of the invention. The apparatus 800 can include computer readable program code means for carrying out and executing the process steps described herein. In one embodiment the computer readable program code is stored in a memory of the device. In alternate embodiments the computer readable program code can be stored in memory or memory medium that is external to, or remote from, the apparatus 800. The memory can be direct coupled or wireless coupled to the apparatus 800. As shown, a computer system 802 may be linked to another computer system 804, such that the computers 802 and 804 are capable of sending information to each other and receiving information from each other. In one embodiment, computer system 802 could include a server computer adapted to communicate with a network 806. Alternatively, where only one computer system is used, such as computer 804, computer 804 will be configured to communicate with and interact with the network 806. Computer systems 802 and 804 can be linked together in any conventional manner including, for example, a modem, wireless, hard wire connection, or fiber optic link. Generally, information can be made available to both computer systems 802 and 804 using a communication protocol typically sent over a communication channel or other suitable connection or line, communication channel or link. In one embodiment, the communication channel comprises a suitable broad-band communication channel. Computers 802 and 804 are generally adapted to utilize program storage devices embodying machine-readable program source code, which is adapted to cause the computers 802 and 804 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

Computer systems 802 and 804 may also include a microprocessor for executing stored programs. Computer 802 may include a data storage device 808 on its program storage device for the storage of information and data. The computer program or software incorporating the processes and method steps incorporating aspects of the disclosed embodiments may be stored in one or more computers 802 and 804 on an otherwise conventional program storage device. In one embodiment, computers 802 and 804 may include a user interface 810, and/or a display interface 812 from which aspects of the invention can be accessed. The user interface 810 and the display interface 812, which in one embodiment can comprise a single interface, can be adapted to allow the input of queries and commands to the system, as well as present the results of the commands and queries, as described with reference to FIG. 1, for example.

The aspects of the disclosed embodiments allow a user to make color measurements using a mobile communication device. It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
providing an indication that a color detection module of a mobile communication device is in a position to detect at least one color on a substrate, wherein an indication comprises at least one of an audible or visual notification;
in an instance in which an indication that the color detection module is in position to detect the at least one color on the substrate is provided, automatically detecting at least one color on the substrate using the color detection module of the mobile communication device; and
identifying the detected color.

2. The method of claim 1 further comprising outputting the result of the identification by adjusting a color of at least a portion of a cover of the mobile communication device to correspond to the detected at least one color.

3. The method of claim 1 further comprising outputting the result of the identification by changing a color of at least one light emitting diode "LED" on the mobile communication device to correspond to the detected color.

4. The method of claim 1 further comprising outputting the result of the identification by changing a color of at least a portion of a display of the mobile communication device to match the detected color.

5. The method of claim 1 further comprising outputting the result of the identification by presenting a textual indication of the detected color on a display of the device.

6. The method of claim 1 further comprising outputting the result of the identification by presenting an audible output identifying the detected color.

7. The method of claim 1 wherein detecting at least one color on a substrate using the mobile communication device comprises:
capturing an image in an instance in which a color imaging sensor of the mobile communication device is placed over the substrate on which the color to be detected is located; and
measuring a color value of the substrate using the color imaging sensor of the mobile communication device.

8. The method of claim 7, wherein measuring a color value of the substrate further comprises:
at least temporarily storing the measured color value in a storage device of the mobile communication device; and
comparing the stored measured color value against a database of color values to identify the color.

9. The method of claim 7, wherein measuring a color value of the substrate further comprises:
transmitting the measured color value to a web service for comparing and identifying the measured color value; and
receiving a result from the web service identifying the detected color.

10. The method of claim 1 wherein automatically detecting at least one color on a substrate using a mobile communication device further comprises:
capturing a first color value measurement and a second color value measurement;
comparing the first color value measurement and the second color value measurement to obtain at least a difference value between the first color value measurement and the second color value measurement; and
using the difference value to identify the detected color.

11. The method of claim 1, further comprising:
after identifying the detected color, storing the detected color in the mobile communication device;
detecting and identifying a color on a second substrate; and
comparing the color identified on the second substrate to the stored color; and
determining if the color identified on the second substrate matches the stored color.

12. An apparatus comprising:
at least one processor; and
at least one memory including computer program code, the at least one memory and the computer program code configured to, with the at least one processor, cause the apparatus at least to:
determine that a color detection module is in a position to detect at least one color on a substrate based on a distance from the substrate;

in an instance in which the color detection module is determined to be in position, automatically detect at least one color value; and identify the detected color value.

13. The apparatus of claim 12 wherein the apparatus comprises a mobile communication device.

14. The apparatus of claim 12 further comprising a cover for the apparatus, at least a portion of the cover being configured to change colors to correspond to the detected at least one color value.

15. The apparatus of claim 14 wherein at least a portion of the cover is an electrochemically reactive material.

16. The apparatus of claim 12 further comprising a control unit that is configured to at least temporarily store the detected at least one color value and cause the mobile communication module to transmit the detected at least one color value to a color matching service for identifying the detected at least one color value.

17. A computer program product comprising:
at least one computer readable non-transitory memory having program code stored thereon, the program code which when executed by an apparatus cause the apparatus at least to:
provide an indication that a color detection module of a mobile communication device is in a position to detect at least one color on a substrate wherein an indication comprises at least one of an audible or visual notification;
in an instance in which the color detection module is in position, automatically detect the at least one color on the substrate using the color detection module of the mobile communication device; and
identify the detected color.

18. The computer program product of claim 17 further comprising program code instructions to: adjust a color of at least a portion of a cover of the mobile communication device to correspond to the detected color.

* * * * *